S. H. JOHNSTON.
FISH TRAP.
APPLICATION FILED OCT. 6, 1917.

1,262,507.

Patented Apr. 9, 1918.

Inventor
S. H. Johnston,
By Victor J. Evans
Attorney

Witnesses

UNITED STATES PATENT OFFICE.

SAMUEL H. JOHNSTON, OF DELTAVILLE, VIRGINIA.

FISH-TRAP.

1,262,507.   Specification of Letters Patent.   Patented Apr. 9, 1918.

Application filed October 6, 1917.   Serial No. 195,093.

*To all whom it may concern:*

Be it known that I, SAMUEL H. JOHNSTON, a citizen of the United States, residing at Deltaville, in the county of Middlesex and State of Virginia, have invented new and useful Improvements in Fish-Traps, of which the following is a specification.

This invention contemplates the provision of a fish trap or the like, and resides in the novel combination, construction and arrangement of parts defined in the appended claims.

The nature and advantages of the invention will be apparent as the following description is read in connection with the accompanying drawing, wherein like numerals of reference indicate similar parts in the several views and in which:—

Figure 1:
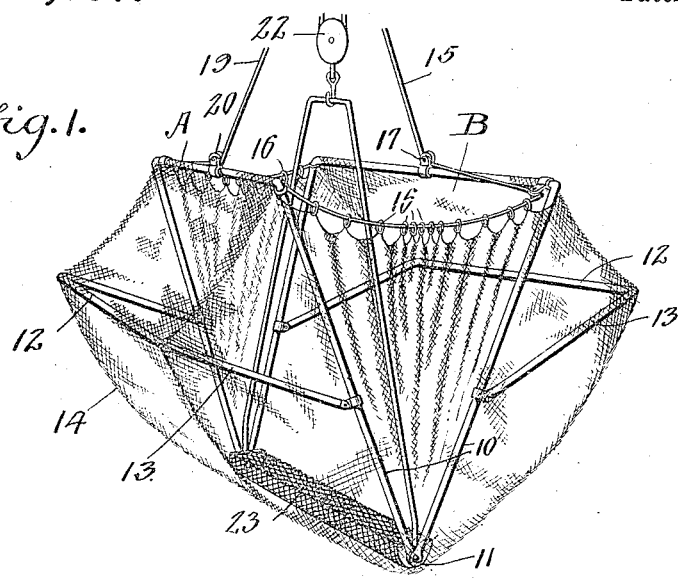
Figure 1 is a perspective view of the trap showing the same partly closed.
Figure 2:
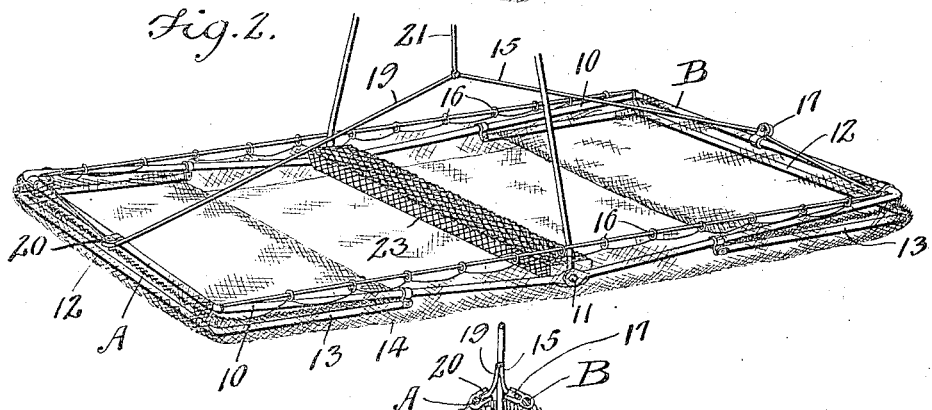
Fig. 2 is a similar view showing the same fully opened.
Figure 3:
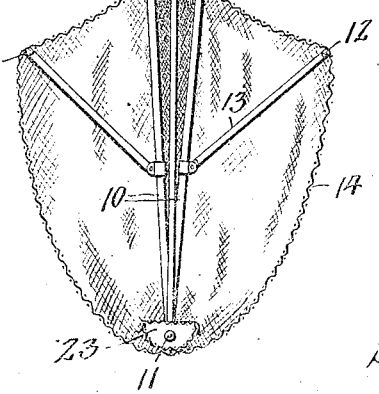
Fig. 3 is a vertical sectional view through the trap closed.

Referring more particularly to the drawing, the trap comprises a frame constructed from any suitable material, preferably iron piping and includes companion sections A and B respectively. Each of the sections is substantially U-shaped, while the adjacent ends of the parallel limbs 10 of the respective sections are hingedly connected together in any suitable manner as at 11. Each section has associated therewith a yoke shaped wing 12, the parallel portions 13 of which have their ends pivotally connected with the limbs 10 at a suitable point in their length. The wings 12 are arranged within the net 14 which may be constructed of any suitable material and associated with the frame in a manner to be presently described, the wings being adapted to hold the net extended when the trap is in full opened position as illustrated in Fig. 2.

A draw rope 15 or the like is threaded through the rings 16 attached to the mouth of the net, and has one end secured to the section A, extending along one side and end of the net, and passed under a pulley 17 on the section B, while a similar draw rope 19 is threaded through the rings 16 at the opposite side and end of the net and has one end secured to the section B. The rope 18 passes under a pulley 20 on the section A and is extended together with the free end of the rope 15 to be connected with a single operating element 21. Manifestly by reason of this construction the sections A and B can be quickly and easily moved toward each other to close the trap or away from each other to open the trap, and in either instance the mouth of the net is correspondingly opened or closed simultaneously with the adjustment of the said sections.

The trap in its entirety is adapted to be lowered into the water in a closed condition by means of the tackle 22 as shown, and as the trap engages the bottom, the operating element 21 is released to permit the sections A and B to move apart and lie substantially in the same horizontal plane. During this adjustment of the sections, the wings 12 engage the bottom, and fold against their respective sections, and in so doing both stretch and hold the body portion of the net extended in the manner clearly shown in Fig. 2. The fish are attracted by the bait contained in some light receptacle, such as for instance a wire basket 23 secured within the net in any suitable manner. If desired the basket may be supported upon the pivots 11 of the sections A and B. At any rate, the fish repose upon the net and are confined within the latter as the trap is closed just prior to elevating the same. To close the trap it is of course necessary to pull upon the operating element 21, whereupon the sections A and B are moved away from the wings 12, and toward each other into contacting engagement, during which operation the mouth of the net is simultaneously contracted as will be readily understood. The trap in its entirety is extremely simple in construction and has been found through experience to be very efficient for its purpose.

While I have shown and described what I now consider the preferred embodiment of the invention, I desire to have it understood that I do not limit myself to the precise construction and arrangement of parts as various changes may be resorted to when desired as fall within the scope of the appended claims without departing from the spirit of the invention.

What is claimed is:—

1. In a trap of the character described, a frame including a pair of similarly formed sections hingedly connected together at one end, a flexible net loosely supported from the frame and enveloping the latter, and means for removing said sections toward and away from each other to an open or closed position.

2. In a trap of the character described, a frame including a pair of hingedly connected sections, a net loosely suspended from the frame, means for moving said sections to an open or closed position, and means carried by said sections and disposed within a net for extending the sides of the latter when said sections assume a predetermined position when being moved toward each other.

3. In a trap of the character described, a frame including a pair of hingedly connected sections, a net loosely suspended from the frame, a wing carried by each section and pivotally associated therewith, said wings being adapted to assume the position parallel with said sections when the latter are in open position, means for moving said sections to an open or closed position, and said wings operating to extend the net when said sections assume a predetermined position while being moved toward each other.

4. In a trap of the character described, a frame including a pair of hingedly connected sections, a net loosely supported by said sections, a pair of U-shaped members pivotally mounted on each of said sections and adapted to fold against the latter when the same is in open position, means for moving said sections toward and away from each other, said U-shaped elements being wholly disposed within the net and adapted to extend the sides of the latter when the said sections assume a predetermined position during their movement toward each other to a closed position.

In testimony whereof I affix my signature in presence of two witnesses.

SAMUEL H. JOHNSTON.

Witnesses:
JOHNSTON G. BLAKE,
MARIAN CLAYTON.

Copies of this patent may be obtained for five cents each, by addressing the "Commissioner of Patents, Washington, D. C."